(12) United States Patent
Chakam et al.

(10) Patent No.: US 7,268,678 B2
(45) Date of Patent: Sep. 11, 2007

(54) DEVICE FOR LOCALIZING A WHEEL ELECTRONICS UNIT IN A MOTOR VEHICLE

(75) Inventors: Guy-Aymar Chakam, Neutraubling (DE); Armin Daiss, Wenzenbach (DE); Frank Fischer, Regensburg (DE); Herbert Froitzheim, Pettendorf (DE); Stefan Hammes, Regensburg (DE); Gregor Kuchler, Thalmassing (DE)

(73) Assignee: Siemens Aktiengesellschaft, Munich (DE)

( * ) Notice: Subject to any disclaimer, the term of this patent is extended or adjusted under 35 U.S.C. 154(b) by 226 days.

(21) Appl. No.: 11/184,356

(22) Filed: Jul. 19, 2005

(65) Prior Publication Data

US 2006/0012470 A1 Jan. 19, 2006

(30) Foreign Application Priority Data

Jul. 19, 2004 (DE) ...................... 10 2004 034 875

(51) Int. Cl.
*B60C 23/00* (2006.01)
*B60C 23/02* (2006.01)
(52) U.S. Cl. .................... 340/442; 340/444; 73/146
(58) Field of Classification Search .............. 340/444
See application file for complete search history.

(56) References Cited

U.S. PATENT DOCUMENTS

| | | | | |
|---|---|---|---|---|
| 5,483,827 A * | 1/1996 | Kulka et al. | ................ | 73/146.5 |
| 6,018,993 A | 2/2000 | Normann et al. | | |
| 6,181,241 B1 | 1/2001 | Normann et al. | | |
| 6,204,758 B1 | 3/2001 | Wacker et al. | | |
| 6,340,930 B1 * | 1/2002 | Lin | ............... | 340/447 |
| 6,489,888 B1 * | 12/2002 | Honeck et al. | ............. | 340/442 |
| 6,591,671 B2 * | 7/2003 | Brown | ................ | 340/442 |
| 6,885,293 B2 * | 4/2005 | Okumura | ................ | 340/448 |
| 6,980,099 B2 * | 12/2005 | Kroitzsch et al. | ........... | 340/447 |
| 7,010,968 B2 * | 3/2006 | Stewart et al. | ................ | 73/146 |
| 7,032,441 B2 * | 4/2006 | Kanatani et al. | .............. | 73/146 |
| 7,053,761 B2 * | 5/2006 | Schofield et al. | ........... | 340/447 |
| 7,116,218 B2 * | 10/2006 | Ogawa et al. | .............. | 340/447 |
| 7,196,615 B2 * | 3/2007 | Nicot et al. | ................. | 340/442 |
| 2003/0071723 A1 * | 4/2003 | Tang et al. | ................. | 340/445 |
| 2004/0008108 A1 | 1/2004 | Kroitzsch et al. | | |

(Continued)

FOREIGN PATENT DOCUMENTS

DE 199 26 616 C2 12/2000

(Continued)

*Primary Examiner*—Benjamin C. Lee
*Assistant Examiner*—Eric M. Blount
(74) *Attorney, Agent, or Firm*—Laurence A. Greenberg; Werner H. Stemer; Ralph E. Locher (57) ABSTRACT

A receiving antenna with a rigid directional pattern, that is to say with an anisotropic receiving sensitivity of the receiving antenna, is used for localizing a wheel electronics unit in a wheel of the motor vehicle. Suitable evaluation of the received electromagnetic signals is provided in order to obtain a functionality achieved by way of the displacement or rotation of the directional antenna in the case of prior solutions. In this respect, a level of the received electromagnetic signal is compared with a predefined threshold value. As the result of the comparison, the wheel electronics unit is localized as being arranged in a wheel of the first wheel group or as being arranged in a wheel of the second wheel group.

11 Claims, 4 Drawing Sheets

U.S. PATENT DOCUMENTS

2005/0188757 A1 * 9/2005 Lin et al. .................. 73/146.5

FOREIGN PATENT DOCUMENTS

| | | |
|---|---|---|
| DE | 102 29 465 A1 | 1/2004 |
| EP | 0 861 160 B1 | 9/1998 |
| EP | 0 967 095 A2 | 12/1999 |
| WO | 03/086787 A1 | 10/2003 |

* cited by examiner

FIG 1

DEVICE FOR LOCALIZING A WHEEL ELECTRONICS UNIT IN A MOTOR VEHICLE

BACKGROUND OF THE INVENTION

Field of the Invention

The invention lies in the field of automotive technology. More specifically, the present invention relates to a device for localizing a wheel electronics unit in a motor vehicle. The unit is used for ascertaining tire pressure sensors, which are arranged in a tire of a motor vehicle, for example.

The tire pressure of motor vehicles has to be checked regularly for safety reasons, although this is something which is very frequently omitted. Modern motor vehicles include tire pressure monitoring devices for this reason among other things, which measure the tire pressure automatically, and which identify at least a critical divergence from a target value and display it to the motor vehicle driver. This therefore makes a manual check unnecessary.

Facilities and systems for monitoring tire pressure make use of electronic wheel units, which are typically assigned to each wheel and send the data collected in a wheel to a vehicle-mounted central evaluation device by using radio-frequency signals. An electronic wheel unit, which is designated as a wheel electronics unit for short in the following, can be understood to mean any device which ascertains information from which the fault conditions possibly occurring at the wheel can be detected. The term "fault condition" must be interpreted broadly in the present context and embraces all conditions, properties and information for a respective wheel which are regarded as being worth detecting.

In this context, a problem nevertheless consists in effecting an automatic and unambiguous assignment of a received signal to the initially unknown wheel position of the transmitter. In addition to the actual detection of a fault condition, therefore, the wheel position of the separate wheels is also ascertained in the case of methods and facilities of this type. This is also designated as localization in the relevant literature. With regard to unambiguously determining the tire pressure sensor which has sent the radio-frequency signal, a large number of different methods are known, a few of which are briefly explained in the following.

For example, the European patent application EP 967 095 A2 describes a use of identification values (ID values) and an assignment of the ID values to tire positions which is preset or modifiable by using user/workshop input. The disadvantage of an approach of this type consists in the danger that, in the case of a wheel change, the necessary re-assignment of the ID values to the changed positions of the wheels is forgotten, for example because such a reassignment has to be carried out manually and the system then assigns the positions incorrectly. An automatic identification of the wheel change does not take place in the case of the solution proposed in EP 967 095 A2.

European patent EP 861 160 B1 (cf. U.S. Pat. No. 6,018,993 and U.S. Pat. No. 6,181,241) describes the use of four separate wheel box antennas. The installation location for antennas of this type, which receive a transmission with the maximum field strength, is defined by the location of the transmitter. Since the transmitters are arranged in the wheels of the vehicle, the antenna therefore also has to be arranged in the vicinity of the wheels, that is to say in the wheel box. The method admittedly works very quickly and relatively reliably, but it requires a major equipment effort.

U.S. Pat. No. 6,204,758 B1 describes the use of a locally installed antenna in order to be able to perform an assignment to an axle. Moreover, the use of acceleration sensors in the wheel electronics units is proposed in order to obtain a side-related localization. The combination of the two aforementioned approaches produces a complete localization of the wheel electronics units in the corresponding wheels or tires in a four-wheeled vehicle. A disadvantage in this case comprises the duplicated additional effort in the case of the receiver field strength evaluation and the acceleration sensors in the wheel electronics units.

Furthermore, German patent DE 199 26 616 C2 describes the use of at least two antennas and a phase shifter in order to be able to align the direction of maximum sensitivity of the antenna system under electronic control. The phase angle at which the received field strength reaches a maximum assigns the transmission to a specific wheel position. The disadvantage of this method lies in the relatively major effort for the provision of the phase shifter and the real-time evaluation.

Moreover, the use of an antenna with a directional pattern is described in the international patent application WO 03/086787 A1, the direction of maximum sensitivity of which can be aligned correspondingly by means of mechanical displacement or rotation of the antenna orientation. A mechanical displacement or rotation of the antenna orientation of this type requires a freely movable antenna arrangement and additionally drive elements for displacing or rotating the antenna arrangement, something which proves to be effort-intensive, prone to malfunction and costly.

SUMMARY OF THE INVENTION

It is accordingly an object of the invention to provide a device for localizing a wheel electronics unit in a motor vehicle which overcomes the above-mentioned disadvantages of the heretofore-known devices and methods of this general type and which provides for an assembly which allows to structure the localization as simply and with as much space savings as possible and in particular as cost-effectively as possible. A further object consists in providing as reliable a localization as possible.

With the foregoing and other objects in view there is provided, in accordance with the invention, a device for localizing a wheel electronics unit in a motor vehicle having a first wheel group and a second wheel group shifted with respect to the first wheel group in a direction of travel of the motor vehicle, the device comprising:

a wheel electronics unit disposed in a wheel of the first wheel group and/or in a wheel of the second wheel group, said first wheel electronics unit having a transmitting device;

a rigid, directionally sensitive receiving antenna disposed substantially centrally between the first wheel group and the second wheel group, within a given margin of tolerance, with reference to the direction of travel of the motor vehicle, said receiving antenna having an anisotropic receiving pattern for receiving an electromagnetic signal from said transmitting device of said first wheel electronics unit, and said receiving antenna exhibiting a higher receiving sensitivity in the direction of travel of the motor vehicle than transversely to the direction of travel;

an evaluation device for evaluating an electromagnetic signal received by said receiving antenna by way of comparing a level of the electromagnetic signal with a predetermined threshold value, said evaluation device assigning the wheel electronics unit to a wheel of the first wheel group if the level is greater than the predetermined threshold value, and/or assigning the wheel electronics unit to a wheel of the second wheel group if the level is less than the predetermined threshold value.

Underlying the present invention is the finding that the use of a receiving antenna with a rigid directional pattern, that is to say with a rigid anisotropic receiving sensitivity of the receiving antenna, means that the localization of a wheel electronics unit in a wheel of the motor vehicle is possible, where the wheel electronics unit emits an electromagnetic signal to be received. In contrast to known solutions, where directional antennas are admittedly used but have to be mechanically rotated or displaced, a rotation or displacement of this type can be dispensed with in the approach according to the invention. Overall, this produces a directional antenna which can be manufactured cost-effectively and which is fault-tolerant.

An important aspect in the case of the present invention is that suitable evaluation of the received electromagnetic signals is provided in order to obtain the functionality achieved by means of the displacement or rotation of the directional antenna as required in the case of prior art solutions. In this respect, a level of the received electromagnetic signal is compared with a predefined threshold value. As the result of this comparison, the wheel electronics unit is localized as being arranged in a wheel of the first wheel group or as being arranged in a wheel of the second wheel group.

By means of the combination of a directional antenna which is essentially immoveable, i.e. connected rigidly to the motor vehicle, in combination with the evaluation device, the present invention offers the advantage of creating a simple, cost-effective, low-effort and reliable option for localizing a wheel electronics unit in a motor vehicle by comparing a level of the received electromagnetic signal with a predefined threshold value.

In accordance with a preferred embodiment of the invention, the first directional antenna is arranged centrally between the first wheel group and the second wheel group, within a margin of tolerance, with reference to the direction of travel. This offers the advantage that an antenna position which is arranged closer to one of the two wheel groups is no longer necessary. This allows simpler positioning options for the directional antenna in the motor vehicle to be implemented. In this respect, the first wheel group and the second wheel group display a distance between each other. The predetermined margin of tolerance preferably lies at the most in the range of half the distance. This offers the advantage that the directional antenna can be arranged within a range between the first and second wheel group and the evaluation of the received signal is therefore simplified, since a direction of incidence of the received electromagnetic signal from a wheel in the first wheel group is directed oppositely to the direction of incidence of the received electromagnetic signal from a wheel in the second wheel group and can therefore be separated more simply by the directional antenna.

The directional antenna is preferably realized as a Vivaldi antenna. This offers the advantage that the directional antenna can be implemented in a very simple form in manufacturing terms, for example on a printed circuit board.

In this respect, the Vivaldi antenna displays an emission section and a receiving section, where the receiving section includes a slotted line which preferably displays a meandering course or cross-section. This enables an implementation of a directional antenna suitable for receiving the electromagnetic signal in a specific frequency range, which can be put into effect in a very space-saving manner.

According to a further embodiment, the first directional antenna displays a receiver device for receiving and relaying a radio remote control signal, which differs from the electromagnetic signal. Furthermore, a processing device is provided for processing the radio remote control signal, which processes the radio remote control signal relayed by the receiver device. An advantage of this version is the fact that in this case a combination of the device for localizing and a device for evaluating a radio remote control signal, such as a remote control motor vehicle key or the like for example, is possible. On the one hand, this allows a separate arrangement of the directional antenna necessary for receiving the electromagnetic signal, additionally to an antenna needed for the reception of the radio remote control signal, to be avoided, which is space-saving. On the other hand, this means that positioning in an optimum location in the motor vehicle for radio reception is possible.

Furthermore, the receiver device can display a printed circuit board for connecting electronic components of a receiving circuit for the radio remote control signal, where the directional antenna is arranged on the printed circuit board. This enables a marked simplification of the manufacturability and arrangement of an aforementioned directional antenna, which therefore has the effect of further reducing costs.

In a further embodiment, at least two wheel groups respectively display at least one wheel electronics unit. Furthermore, at least a second directional antenna, rigidly connected to the motor vehicle, is provided for receiving electromagnetic signals, where the further directional antenna displays a maximum receiving sensitivity in a direction which is opposed—within a predetermined margin of tolerance—to the direction of a maximum receiving sensitivity of the first directional antenna. Finally, a switchover device is provided for connecting the evaluation device either to the first directional antenna and/or to the second directional antenna, where the evaluation device is designed to assign the wheel electronics unit to one of the wheel groups depending on the level of the received electromagnetic signal. The predetermined margin of tolerance by which the second directional antenna is arranged opposite to the first directional antenna comprises an angle of divergence of ±45° for example. This offers the advantage of a more precise and therefore more reliable option for localizing a respective wheel electronics unit.

In another embodiment, at least two wheel electronics units are provided in the case of at least one wheel group, which are respectively assigned to wheels, which are arranged on laterally opposite sides of the wheel group with reference to the direction of travel. Furthermore, at least one directional antenna displays a first and at least a second partially directional antenna, where the first and second partially directional antennas respectively display a different main receiving direction with high receiving sensitivity, where the first and second partially directional antennas with their respective main receiving direction are aligned in such a way that they respectively receive from the corresponding wheel electronics unit of the assigned wheel a maximum level, lying within a prescribed margin of tolerance, of the electromagnetic signal sent out by that wheel electronics unit. By way of advantage, as accurate an evaluation as possible of the received electromagnetic signals is enabled in this way. If the partially directional antennas are aligned to a respective main direction of incidence of the electromagnetic signals sent out by the wheel electronics units of the wheels of the respective wheel group, in particular, an embodiment of this type can enable a markedly improved assignment of the signals to the wheel electronics units, giving rise to a markedly greater reliability of the results ascertained than by means of the sole evaluation of one electromagnetic signal received by one directional antenna. Moreover, reflections or field distortions at metal parts of the motor vehicle can also be utilized to effect an improvement in the evaluation ability of a received signal without the directional antenna having to be aligned direct to the wheel electronics unit sending out the corresponding electromagnetic signal.

In a particular embodiment, the switchover device displays connecting means, where the evaluation device is capable of being connected successively to the separate partially directional antennas by way of the connecting means. This enables a sequential readout and evaluation of the electromagnetic signals received by the partially directional antenna, which makes itself felt in a reduction in the effort necessary for evaluation. It is particularly advantageous if the partially directional antennas and/or the directional antennas are realized in identically constructed form, which markedly reduces their manufacturing effort with respect to a non-identically constructed embodiment-of those antennas.

In a further embodiment, a main receiving direction of a maximum receiving sensitivity of at least one of the partially directional antennas is aligned in a geometrical direction with the shortest distance to the correspondingly assigned wheel. Such an arrangement offers the advantage that the wheels can be localized better through the alignment of the partially directional antennas than is possible by means of another geometrical alignment. This is due in particular to the higher receivable field strength of an electromagnetic signal, if a directional antenna displays a main receiving direction, i.e. a receiving direction with maximum receiving sensitivity, which points directly in the direction of the wheels lying closest.

In particular, the evaluation device can be designed to perform an assignment of the received electromagnetic signals to the corresponding wheel electronics unit sending those electromagnetic signals out and therefore to the corresponding wheel group by means of a comparison of the respective levels of those electromagnetic signals. An evaluation device realized in such a way offers the advantage of compensating for possible interference in the signals through the mutual comparison of the levels of the different signals, since interference of this type characteristically affects all signals to the same extent.

In a further advantageous embodiment, the evaluation device is designed to perform an assignment of the received electromagnetic signals to the corresponding wheel electronics unit sending those electromagnetic signals out and therefore to the corresponding wheel group by means of a comparison of the respective electromagnetic signals with a receiving threshold value. This means that it is possible to detect whether the signal was sent out by a wheel electronics unit belonging to the motor vehicle at all, or whether the received signal was sent out from a position external to the motor vehicle—for example from another motor vehicle. In particular, in urban areas with a high traffic density and therefore a high likelihood of a motor vehicle occurring within radio range of the directional antenna with a wheel electronics unit which is similarly sending out a corresponding electromagnetic signal, incorrect localization can be prevented by means of a version of the evaluation unit of this type. This can be done through the transmission by the wheel electronics unit of an additional code of the motor vehicle in the electromagnetic signal, for example.

The wheel electronics unit in the wheel is preferably realized in such a way as to transmit an item of information about a modifiable physical variable of the wheel to the evaluation device with the aid of the electromagnetic signal. This enables in particular the transfer of, for example, tire pressure information, tire temperature information, acceleration information, speed information or the like with the aid of the electromagnetic signal sent out by the wheel electronics unit, but without transferring information about the position of the corresponding wheel electronics unit since this position is capable of being identified by the device for performing localization.

Other features which are considered as characteristic for the invention are set forth in the appended claims.

Although the invention is illustrated and described herein as embodied in a device for localizing a wheel electronics unit in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
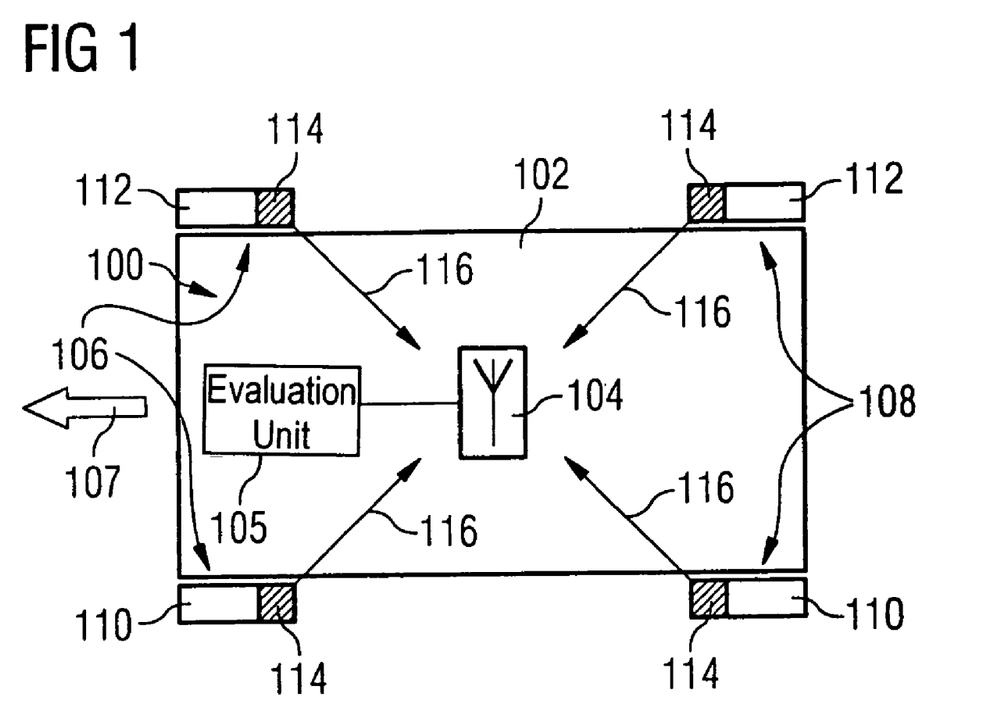
FIG. 1 shows a schematic representation of a motor vehicle with a The device according to the invention.

Referring now to the figures of the drawing in detail and first, particularly, to FIG. 1 thereof, there is shown an exemplary embodiment of a device 100 for localizing a wheel electronics unit in a motor vehicle 102. In this respect, the device 100 for performing localization is arranged in a motor vehicle 102 and includes a directional antenna 104 and also an evaluation device 105 connected to the directional antenna 104. Furthermore, the motor vehicle 102 includes a first wheel group 106 and a second wheel group 108 shifted with respect to the first wheel group 106 in a direction of travel 107 of the motor vehicle 102. In this respect, each wheel group 106, 108 can be regarded as an axle of the vehicle 102 (for example a front axle 106 and a rear axle 108) which respectively displays, viewed in the direction of travel, a wheel 110 on the left side of the motor vehicle 102 and a wheel 112 on the right side of the motor vehicle 102. Furthermore, each left-hand wheel 110 and each right-hand wheel 112 of the first wheel group 104 and the second wheel group 108 displays a wheel electronics unit 114 for emitting an electromagnetic signal 116 to the directional antenna 104. FIG. 1 therefore shows a vehicle with a common receiver and four transmitting electronics units in the vehicle wheels.

Figure 2A:
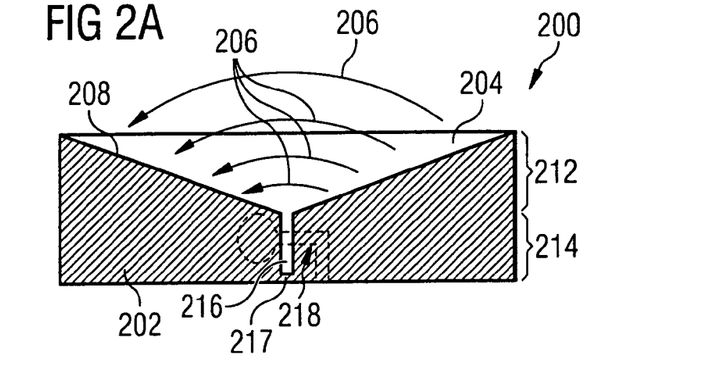
FIG. 2A shows a first exemplary embodiment of a directional antenna according to the invention.
Figure 2B:
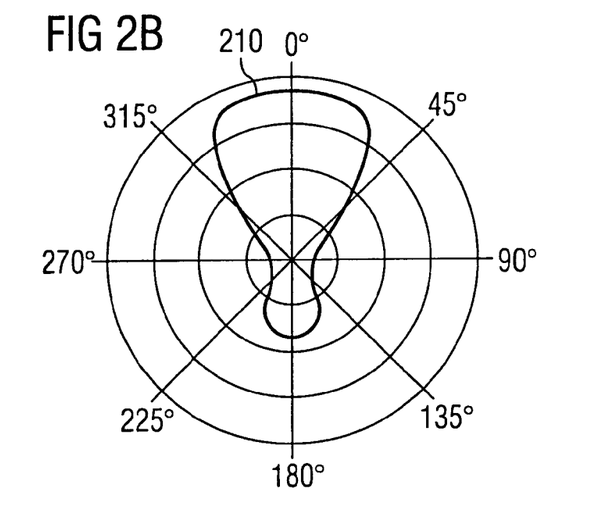
FIG. 2B shows a directional pattern of the directional antenna represented in FIG. 2A.

As already mentioned in the foregoing, the observation underlying the invention is that suitable shaping of a receiving antenna makes it possible to realize its receiving pattern anisotropically. FIG. 2A shows an embodiment by way of example of such a receiving antenna, where directionally sensitive antennas of this type are known under the keyword 'Vivaldi antennas', for example, in the radio-frequency literature. Such a Vivaldi antenna is known, for example, from the article "Improved Design of the Vivaldian Antenna" by E. Gazit, IEEE Proceedings, Vol. 135, No. 2, April 1988. In FIG. 2A, the hatched area 202 represents the sheet-metallized area of a conventional printed circuit board, for example. The schematically indicated electrical field lines 206 develop in the metal-free area 204. The corresponding magnetic field lines run perpendicular to these and to the plane of the paper. A funnel-like geometrical embodiment 208 of the metallized surfaces results in the directionally dependent guidance of an electromagnetic wave and therefore to a schematically represented angular dependency of the antenna pattern of a Vivaldi antenna 200 of this type, as represented by the directional pattern 210 in FIG. 2B.

In principle, a Vivaldi antenna, as represented in FIG. 2A, can be divided into two parts: the actual antenna 212 and a receiving unit 214, or feed unit. The actual antenna 212 consists of a slotted line 216 broadening out like a funnel in the emitting or coupling direction, which is short-circuited on the rear side 217 (that is to say on the side lying opposite to the actual antenna 212). In this respect, the broadening of the slotted line 216 can be structured in an exponential, linear or circular manner. The task of the feed unit 214 is to balance the signal applying at the coaxial connection for feeding the slotted line 216. This is effected with a March-and-Balun, which secures the transition from a microstrip line 218 on a lower side of the printed circuit board to the slotted line 216 on the upper side of the printed circuit board. In other words, this means that a Vivaldi antenna can be realized by the simple realization of a metallized area on a printed circuit board, where the feed is effected from the lower side of the printed circuit board by means of a corresponding balun, while the Vivaldi antenna is implemented on the upper side of the printed circuit board. The geometrical dimensioning of the antenna (that is to say the proportions of the broadening, width and length of the slotted line or the microstrip line 218, etc.) can be adapted in an application-related manner to a specific frequency and a desired directional pattern. A realization of the Vivaldi antenna 200 with an extended slotted line 216 is indicated by way of example in FIG. 2C. The extension can be continued in a meandering manner in order to enable an adaptation to comparatively long wavelengths at comparatively low frequencies (for example approx. 70 cm wavelength in the 433 Megahertz band) in a space-saving manner on the printed circuit board.

Figure 2C:
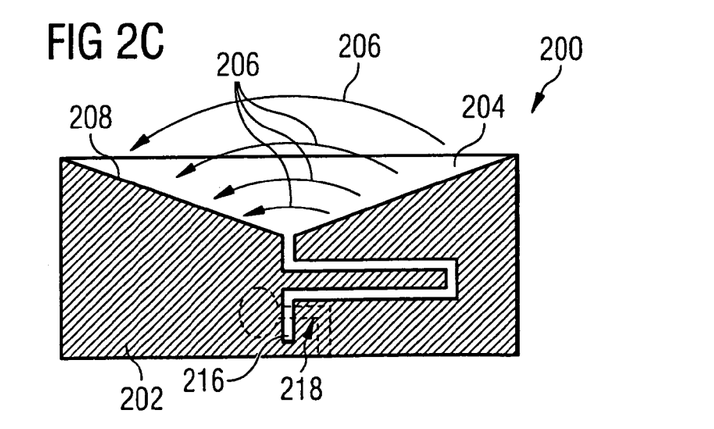
FIG. 2C shows a second exemplary embodiment of a directional antenna according to the invention.

In the first instance, for example, the antenna represented in FIG. 2C can be used on the basis of the frequencies released or employable for the localization of wheel electronics units, in order thereby to enable the assignment of a transmitting wheel electronics unit to one of two wheel groups. The intrinsically known method of using a locally installed antenna to be able to perform the assignment to an axle and the use of acceleration sensors in the wheel electronics units to obtain a side-related localization restricts the installation of the (isotropically sensitive) antenna to essentially two positions: markedly further forward than central, or markedly further rearward than central. An approximately central installation location is ruled out due to the thus absent difference in signal between the receiving field strengths of front and rear wheel electronics units. In order to keep the equipment effort as low as possible, antennas and receivers integrated into control units are used, wherever possible, which should often be available for further vehicle functions alongside the tire-pressure monitoring (for example a remote control key function). These further functions often rule out for the axle-based localization of the tire-pressure monitoring the aforementioned or required local installation either markedly further forward than central or markedly further rearward than central of a central axle of a motor vehicle running transversely to the direction of travel.

As opposed to the approach of a locally installed antenna for axle assignment and the use of acceleration sensors for side-related localization, an antenna with a directional pattern is used in the approach according to the invention, as represented in FIG. 2C (and the directional pattern in FIG. 2B), for example. This expands the possible installation location of an antenna of this type to all locations in the vehicle which lie on a central line of the vehicle, within a margin of tolerance. The margin of tolerance can be selected in such a way that the directional antenna is preferably arranged centrally between the first and second wheel groups, that is to say that the directional antenna is arranged about a central line of the vehicle within a margin of tolerance of half the distance between the two wheel groups. This arrangement within the area between the two wheel groups should be observed since, in the event of an arrangement of the directional antenna outside this area, clear differentiation of the direction of incidence of the electromagnetic signals by the wheel electronics units of the wheel groups is no longer possible and this leads to a deterioration in the evaluation ability of corresponding electromagnetic signals.

The directional pattern of the directional antenna then enables the assignment of a wheel electronics unit (for example through the use of a simple discriminator circuit) to the front wheel group, that is to say the front axle, if the antenna together with the direction of maximum sensitivity points forward and the received field strength is higher than a predetermined threshold. A similar situation also applies to the assignment to the rear axle. If the directional antenna is aligned in such a way, for example, that the maximum receiving sensitivity points in the direction of the rear axle, a comparison of the received field strength with the predetermined threshold makes it possible to establish whether the received signal originates from the rear axle or not. The advantage of using such a directional antenna with a directional pattern as is reproduced by means of the directional pattern represented in FIG. 2B lies in this case in the opening up of further installation locations in the vehicle. In particular, central installation locations (for example in the area of the rear-view mirror or a roof control unit) become possible through the use of a directional antenna of this type. Central installation locations of this type are known as preferred installation locations for the receivers of radio remote control elements, for example. However, they have been unusable up to now for axle-based localization of wheel electronics units due to the lack of assignability of wheel electronics units in the case of the arrangement of a receiving antenna in center of the vehicle. In particular, a combination of a directional antenna (for localization) together with an isotropic antenna in one unit or on one printed circuit board in conjunction with a common receiver must be considered in order to enable secure reception of the radio remote control with a simultaneous localization function of the tire-pressure monitoring.

Figure 3:
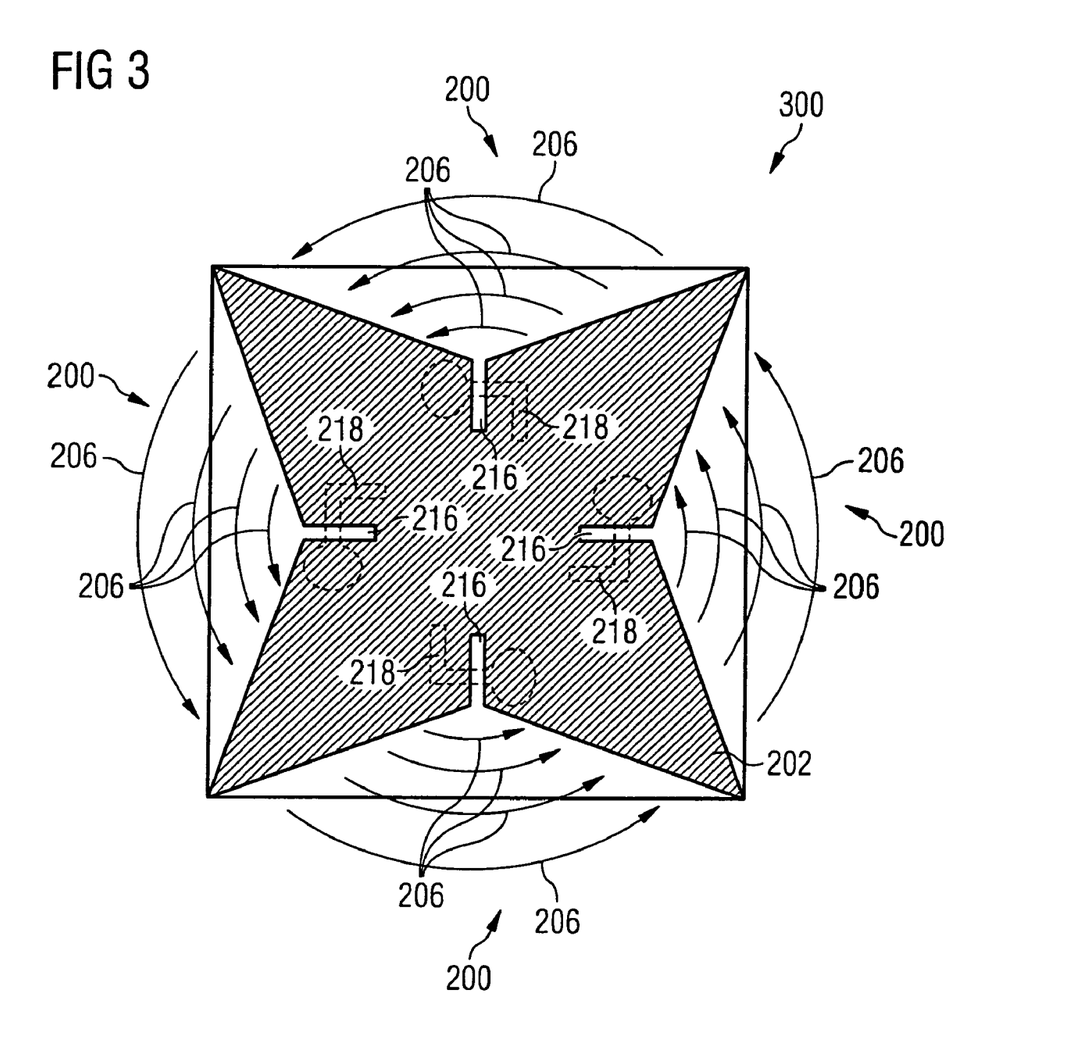
FIG. 3 shows a device according to the invention with four partially directional antennas.

In a further exemplary embodiment, a combination of four (preferably identically constructed) directional antennas can also be used as an antenna system 300, for example as represented in FIG. 3. The preferred directions of the four antennas lie, for example, respectively in pairs at an angle of 90° to each other. In this respect, for example, the antenna system 300 can be arranged on a printed circuit board. The four directional antennas 200 can, for example, be connected via a multiplexer (not shown here) to a receiver or an evaluation device, for example as represented in FIG. 1 with the symbol 106, so that only one antenna is ever connected to the receiver. By means of sequential swapping of the receiving antennas, the receiver "listens" successively in one of the four preferred receiving directions of the arrangement (that is to say in one of the four main receiving directions or the four directions with the maximum receiving sensitivity). However, the precise alignment of the antennas 200 on the printed circuit board can also be coordinated in such a way to the subsequent installation location of the printed circuit board in the vehicle that following installation, one of the four antennas 200 respectively together with its direction of maximum sensitivity is aligned to exactly one wheel of the vehicle. In this respect, the geometric direction of the wheel (viewed from the installation location of the printed circuit board) does not necessarily need to be identical to the alignment of the maximum sensitivity of the assigned antenna. Instead, this can be intentionally structured to be "misoriented" on the basis of vehicle measurements in order to be aligned to the direction of maximum field strength of a transmission from the assigned wheel. The reason for this is field distortions which can be brought about by the engine or body parts, for example, and to some extent can lead to considerable divergences in the direction of maximum field strength from the geometrical direction of the wheel (that is to say the shortest distance between the wheel and the receiving antenna).

Given suitable implementation of the antenna printed circuit board, an assignment of the received transmission to a specific wheel is possible by means of multiplexing of the four antennas 200 and evaluation, for example by way of a received signal level. In this respect, the comparison can be effected absolutely with a permanently prescribed receiving threshold (for example in order to differentiate "on-vehicle" from "off-vehicle" wheel electronics units) or relatively between the four different antennas. As the result, the received transmission (that is to say the received electromagnetic signal) is assigned to exactly one wheel and in the former case, additionally checked for association with the same vehicle. The methods arising from the state of the art (that is to say the more exact field strength evaluation; identification values; comparison with prestored information; evaluation of acceleration, pressure and temperature; comparison with wheel speed sensors, etc.) can continue to be used and can verify the localization result.

Figure 4:
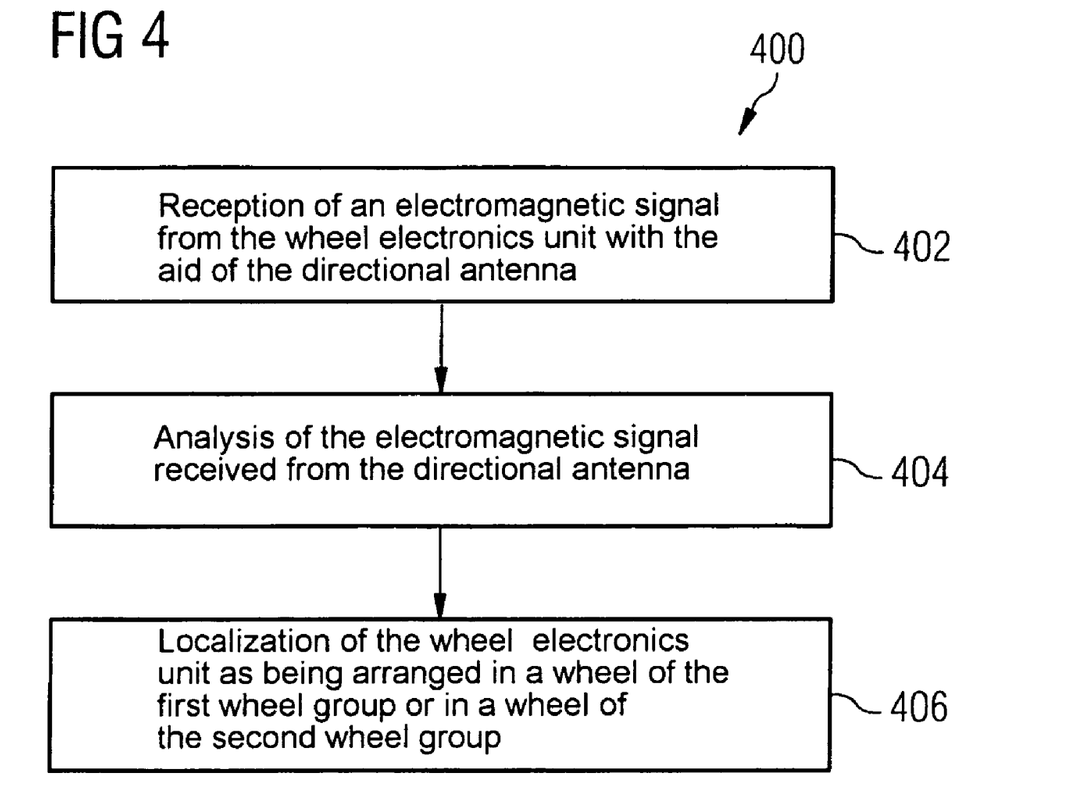
FIG. 4 shows a flowchart of a method according to the invention for localizing a wheel electronics unit in a motor vehicle.

FIG. 4 shows a flowchart of an exemplary embodiment of the method according to the invention. In this respect, the reception 402 of an electromagnetic signal from the wheel electronics unit with the aid of the directional antenna is effected in a first stage. The evaluation 404 of the electromagnetic signal received from the directional antenna follows in a stage after this, after which the localization 406 of the wheel electronics unit as being arranged in a wheel of the first wheel group or in a wheel of the second wheel group is effected in a third stage. The localization 406 is preferably effected on the basis of the evaluation of the result of a comparison of a level of the received electromagnetic signal with a prescribed threshold value, in order to enable the identification of the wheel electronics unit in a first wheel of a first wheel group or in a wheel of the second wheel group on the basis of the result of the comparison To summarize, it can therefore be established that with a directional antenna, axle-based localization can be improved and at the same time a flexibility in the choice of possible installation locations for the directional antenna in the vehicle is possible. With regard to existing local installation locations, the signal distance between the reception levels of wheel electronics units of the two axles is improved, in order to enable an even more exact differentiation between front and rear. Combination with an isotropic receiving antenna in one unit enables a centrally installed radio remote control receiver to be implemented, which at the same time is capable of localizing wheel electronics units with reference to their installation axle without any further external antenna. As a result of the fact, in particular, that the directional antenna can be implemented on a printed circuit board, for example of the radio remote control receiver, it is possible to save costs, space and effort by avoiding the need to install an additional directional antenna, something which contributes to a further flexibility and improvement in the employability of such a device for localizing a wheel electronics unit in a motor vehicle.

The expansion to four directional antennas enables the implementation of complete radio-frequency localization (RF localization) without mechanical antenna correction at a central installation point (given observance of a combination with a radio remote control) and with little additional extra effort. The directional antenna, which is preferably to be realized as a printed circuit board antenna, can then be implemented very cost-effectively and can be integrated in a roof control unit, for example. The localization is effected during the preferable radio reception and has virtually no convergence time. The localization information is then available simultaneously with, for example, the demodulated data which can deliver information about a physical parameter of the wheel or the tire, such as the tire pressure, the tire temperature or the like, for example.

This application claims the priority, under 35 U.S.C. § 119, of German patent application No. 10 2004 034 875.8, filed Jul. 19, 2004; the entire disclosure of the prior application is herewith incorporated by reference.

We claim:

1. A device for localizing a wheel electronics unit in a motor vehicle having a first wheel group and a second wheel group shifted with respect to the first wheel group in a direction of travel of the motor vehicle, the device comprising:
   a wheel electronics unit disposed in a wheel of the first wheel group and/or in a wheel of the second wheel group, said first wheel electronics unit having a transmitting device;
   a rigid, directionally sensitive receiving antenna disposed substantially centrally between the first wheel group and the second wheel group, within a given margin of tolerance, with reference to the direction of travel of the motor vehicle, said receiving antenna having an anisotropic receiving pattern for receiving an electromagnetic signal from said transmitting device of said first wheel electronics unit, and said receiving antenna exhibiting a higher receiving sensitivity in the direction of travel of the motor vehicle than transversely to the direction of travel;

an evaluation device for evaluating an electromagnetic signal received by said receiving antenna by way of comparing a level of the electromagnetic signal with a predetermined threshold value, said evaluation device assigning the wheel electronics unit to a wheel of the first wheel group if the level is greater than the predetermined threshold value, and/or assigning the wheel electronics unit to a wheel of the second wheel group if the level is less than the predetermined threshold value.

2. The device according to claim 1, wherein said directional antenna is a Vivaldi antenna.

3. The device according to claim 2, wherein said Vivaldi antenna has a transmission section and a receiving section, and said receiving section has a slotted line with a meandering course.

4. The device according to claim 1, wherein said directional antenna has a receiver device for receiving and relaying a radio remote control signal, different from the electro-magnetic signal, and wherein a processing device is provided for processing the radio remote control signal relayed by said receiver device.

5. The device according to claim 4, wherein said receiver device includes a printed circuit board for connecting electronic components of a receiving circuit for the radio remote control signal, and said directional antenna is disposed on said printed circuit board.

6. The device according to claim 1, wherein:

said wheel electronics unit is a first wheel electronics unit disposed in the first wheel group and a second wheel electronics unit disposed in the second wheel group;

said directional antenna is one of at least two antennas including a first directional antenna and a second directional antenna, each stationarily mounted to the motor vehicle and each for receiving electromagnetic signals, said second directional antenna having a maximum receiving sensitivity in a direction opposed, within a predetermined margin of tolerance, to the direction of a maximum receiving sensitivity of said first directional antenna; and a switchover device for connecting said evaluation device to at least one of said first directional antenna and said second directional antenna, and wherein said evaluation device is configured to assign said wheel electronics unit to one of the wheel groups depending on the level of the received electromagnetic signal.

7. The device according to claim 1, wherein:

at least one wheel group additionally includes at least one further wheel, disposed on a side laterally opposite the wheel with reference to the direction of travel and having a second wheel electronics unit for sending out a second electromagnetic signal;

at least one directional antenna includes a first and at least a second partially directional antenna, where the first and second partially directional antennas respectively have a different main receiving direction with high receiving sensitivity; and said first and second partially directional antennas with the respective main receiving direction thereof are aligned to respectively receive from the corresponding wheel electronics unit of the assigned wheel a maximum level, within a prescribed margin of tolerance, of the electromagnetic signal sent out by the respective said wheel electronics unit.

8. The device according to claim 7, wherein said switchover device includes a connecting device and said evaluation device is capable of being connected successively to the separate partially directional antennas by way of said connecting device.

9. The device according to claim 7, wherein a main receiving direction of a maximum receiving sensitivity of at least one partially directional antenna is aligned in a geometrical direction with a shortest distance to the correspondingly assigned wheel.

10. The device according to claim 7, wherein said evaluation device is configured to assign the received electromagnetic signals to the corresponding wheel electronics unit and to the corresponding wheel group by way of a comparison of the respective levels of the electromagnetic signals.

11. The device according to claim 1, wherein said evaluation device is configured to assign the received electromagnetic signal to a corresponding said wheel electronics unit sending the electromagnetic signals out and therefore to the corresponding wheel group by way of a comparison of the respective electromagnetic signal with a receiving threshold value.

* * * * *